United States Patent
Mende et al.

(10) Patent No.: US 10,151,832 B2
(45) Date of Patent: Dec. 11, 2018

(54) METHOD FOR DETERMINING THE DISTANCE AND RELATIVE SPEED OF A REMOTE OBJECT

(71) Applicant: S.M.S. Smart Microwave Sensors GmbH, Braunschweig (DE)

(72) Inventors: Ralph Mende, Braunschweig (DE); Fabian Kyrisch, Lehre (DE)

(73) Assignee: S.M.S. SMART MICROWAVE SENSORS GMBH, Braunschweig (DE)

( * ) Notice: Subject to any disclaimer, the term of this patent is extended or adjusted under 35 U.S.C. 154(b) by 398 days.

(21) Appl. No.: 14/892,241

(22) PCT Filed: May 14, 2014

(86) PCT No.: PCT/DE2014/000249
§ 371 (c)(1),
(2) Date: Nov. 19, 2015

(87) PCT Pub. No.: WO2014/187443
PCT Pub. Date: Nov. 27, 2014

(65) Prior Publication Data
US 2016/0124085 A1 May 5, 2016

(30) Foreign Application Priority Data
May 22, 2013 (DE) .................. 10 2013 008 607

(51) Int. Cl.
*G01S 7/35* (2006.01)
*G01S 13/34* (2006.01)
*G01S 13/58* (2006.01)

(52) U.S. Cl.
CPC .......... *G01S 13/584* (2013.01); *G01S 13/343* (2013.01); *G01S 13/347* (2013.01); *G01S 2007/356* (2013.01)

(58) Field of Classification Search
CPC .... G01S 13/584; G01S 13/343; G01S 13/347; G01S 2007/356
(Continued)

(56) References Cited

U.S. PATENT DOCUMENTS

| 5,963,163 | A | 10/1999 | Kemkemian et al. |
| 9,645,228 | B1* | 5/2017 | Doerry ................ G01S 13/284 |
| 9,772,397 | B1* | 9/2017 | Bordes .................. G01S 7/023 |

FOREIGN PATENT DOCUMENTS

| EP | 0863409 A1 | 9/1998 |
| EP | 1635188 A1 | 3/2006 |
| EP | 1325350 B1 | 10/2007 |

OTHER PUBLICATIONS

Machine Translation of EP1635188A1 (Year: 2006).*
(Continued)

*Primary Examiner* — Frank J McGue
(74) *Attorney, Agent, or Firm* — W & C IP

(57) ABSTRACT

The invention relates to a method for determining the distance (R) and relative speed (v) of at least one object remote from an observation point, comprising the following method steps: continuous transmission of at least one first and one second electromagnetic signal in each case of a signal period ($T_{chirp}$) from the observation point; the signals consist of signal portions (bursts) having a constant frequency and a predetermined equal duration, wherein the signal portions of a signal cover a predetermined modulation range by means of frequency steps; the signals are transmitted interlaced in that signal portions of the different signals follow one another in time, wherein a frequency hop occurs between the successive signal portions of different signals, receiving the signals reflected by the object as an echo signal and carrying out a mixed operation with the transmission signal for transformation of the received signal into the baseband in a common analog channel; carrying out
(Continued)

an analog-to-digital conversion and sampling the received signal portions of the echo signals and extraction of at least one sampling value for each signal portion; separately evaluating the sampling values for the different echo signals of the different emitted signals by means of a Fourier transformation stage and determining the frequency of the peaks corresponding to signal portions and determining a phase difference between the echo signals of the transmitted signals, characterised in that the signal portions of the second signal (B) are transmitted by means of the same frequencies as corresponding signal portions of the first signal (A).

5 Claims, 3 Drawing Sheets

(58) Field of Classification Search
USPC .......................................................... 342/109
See application file for complete search history.

(56) References Cited

OTHER PUBLICATIONS

Meinecke et al., "Combination of LFMCW and FSK Modulation Principles for Automotive Radar Systems." German Radar Symposium GRS2000, Berlin, Oct. 11, 2000, Whole Document.

* cited by examiner

METHOD FOR DETERMINING THE DISTANCE AND RELATIVE SPEED OF A REMOTE OBJECT

The invention relates to a method for determining the distance and relative speed of at least one object remote from an observation point, comprising the following method steps:

continuously emitting at least a first and a second electromagnetic signal with a respective signal period ($T_{Chirp}$) from the observation point;

the signals consisting of signal sections (bursts) of constant frequency and of a prescribed equal duration, the signal sections of a signal sweeping a prescribed modulation range with frequency steps;

the signals being emitted in a fashion interleaved with one another by virtue of the fact that the signal sections of the various signals are mutually adjacent in time, a frequency hop being present between the mutually adjacent signal sections of different signals, receiving the signals reflected as echo signal from the object, and carrying out a mixing operation with the transmitted signal in order to transform the received signal into the baseband in a common analog channel;

carrying out an analog-to-digital conversion and sampling the received signal sections of the echo signals and withdrawing at least one sample for each signal section;

separately evaluating the samples for the various echo signals of the various emitted signals by means of a Fourier transformation stage, and determining the frequency of peaks corresponding to the signal sections and determining a phase difference between the echo signals of the emitted signals.

Such a method is used, in particular, to detect road users in road traffic. In this context, the observation point can be fixed when, for example, the aim is to detect the traffic volume on a very busy road, at an intersection or at other traffic hotspots. A further field of application for such a method is for driver assistance systems. The latter are based on the fact that the traffic is detected relative to a possibly moving motor vehicle and evaluated so that, if appropriate, it is possible to detect critical situations which lead to the triggering of a warning signal or, if appropriate, intervene in the control of the motor vehicle in emergencies. Known systems of this type can regulate the distance from the vehicle driving in front, detect a danger of collision when changing lanes and, if appropriate, trigger emergency braking when there is a danger of collision with an obstacle.

It is essential for such systems that a plurality of objects be reliably detected and that it is also possible to assign said objects a correct relative speed.

The present invention is concerned with continuously emitted electromagnetic signals, in particular radar signals. In particular, it is frequency bands between 76 and 77 GHz and between 24 and 24.25 GHz that are important for traffic applications. In the case of said high frequencies, it is possible to implement antennas of very small size because of the small wavelengths of 4 mm and 12.5 mm, respectively, so that the space requirement for radar sensors is small, and the latter can be mounted on a vehicle inconspicuously.

A signal emitted at a constant frequency which is reflected by a moving object can be used in a very fundamental way to establish the relative speed of the moving object by establishing the frequency shift caused by the Doppler effect. In order to be able to determine the transit time of the emitted, reflected and once more received signal, from which a determination of distance results, it is known to vary the frequency of the emitted signal periodically, for example have it rise linearly or fall linearly. The frequency difference between the emitted signals and those received once again contains information about the distance, although so unambiguously only when the object does not move relative to the observation point. Otherwise, ambiguities arise because of the superposition to the distance measurement and the Doppler effect. The ambiguities can be at least partially eliminated by suitable design of the emitted signals and/or signal periods. Thus, for example, it is known to emit a plurality of different signal periods ($T_{Chirp}$) in order to calculate unambiguous measured values by evaluating the individual $T_{Chirp}$, but also the total signals. One disadvantage of this is the multiple measurement time owing to the use of a plurality of $T_{Chirp}$, which is critical both for warning applications and for intervention in the control of the motor vehicle in emergency situations.

It is therefore known for the purpose of shortening the measurement time to mutually interleave a plurality of emitted signals by forming signal sections, for example for two signals, and alternately emitting a signal section of a first signal, a signal section of a second signal etc. The number of the mutually interleaved signals is not limited in principle in this case.

In the method of the type mentioned at the beginning, which is known from EP 1 325 350 B1, signal sections of constant frequency are emitted. During a signal period ($T_{Chirp}$), the signal sections of a signal sweep a prescribed modulation range ($f_{Sweep}$) by stepped jumping of the frequencies of the signal sections of the relevant signal. Quick and stable evaluations can be undertaken by the use of constant frequencies within a signal section. The evaluation principle is based on the fact that an ambiguity straight line respectively exists in the distance/speed coordinate system on account of the frequency determination undertaken and the phase determination. However, it is possible to determine a point of intersection of the two straight lines which enables the desired assignment of the location and the relative speed of an object. For a correct evaluation, it is sensible to design the two ambiguity straight lines so that they are perpendicular as far as possible, or virtually perpendicular to one another. The straight line resulting from the frequency measurement can have its slope set by selecting the modulation range, while the frequency shift between two mutually interleaved, emitted signals is relevant for the slope of the straight line resulting from the phase determination. The frequency difference between the signal sections of the two interwoven signals therefore constitutes a parameter with which the signal-to-noise ratio of the evaluation can be influenced.

The known method has proved itself in practice. However, for difficult monitoring situations there is a need for three or four different signals to be mutually interleaved in order to attain unambiguous measurement results with reference to the distance. The outlay on evaluation is therefore substantial and necessitates not only powerful algorithms, but also fast computer powers. Furthermore, evaluation of complicated situations also necessitates substantial outlay in the transmitter part of the arrangements for carrying out the method.

It is therefore the object of the present invention to configure the method of the type mentioned at the beginning so as to enable a simplified evaluation without substantially extending the measurement time, even for complicated situations.

For the purpose of achieving said object, the method mentioned at the beginning is characterized according to the invention in that the signal sections of the second signal are emitted at the same frequencies as corresponding signal sections of the first signal.

The method according to the invention is therefore based on a frequency difference of zero between the signal sections of the first signal and of the second signal. As compared with the first signal, in the simplest case the second signal has only a time offset and can be otherwise of identical design.

The method according to the invention is based on the finding that, given the frequency difference zero between signal sections of the first signal and of the second signal, the ambiguity straight lines in the distance/speed coordinate system run parallel to the distance coordinate and thus do not depend on location. Consequently, when the phase is being measured it is possible to determine the relative speed directly and unambiguously, because the measurement result is not a function of the distance of the object from the observation point. The speed can be determined in this way and input into the frequency measurement, which is ambiguous per se, and so it is possible to use the frequency measurement to determine the distance unambiguously in relation to the speed values established.

The invention does not exclude the additional use of a third signal in the case of signal interleaving. However, it has emerged that the use of two mutually interleaved signals is sufficient as a rule even for complicated situations.

In this case, the evaluation is preferably performed in a way known per se by a quadrature demodulation of the received signals, that is to say a separation of imaginary and real parts. The signals thus transposed into the baseband are digitized and subjected to a fast Fourier transformation separately signal by signal. Using the threshold value method, peaks are determined conventionally in the frequency range which are thus assigned to specific frequencies. The frequency is determined for each signal. Subsequently, the phase of the respective frequency is determined and the phase difference between the two received signals is formed. The frequency includes the relative speed and the distance as parameters. Since it is already possible to determine the speed by determining the phase difference, the associated distance can be calculated in a simple way.

It turns out that the time shift of the two signals with reference to the signal sections of the same frequency should preferably be at least the length of three signal sections. A lesser time shift leads to an excessively low significance of the phase measurement for the speed to be determined, since the rise in the measured phase as a function of the speed becomes too low and is therefore accompanied by an excessively low signal-to-noise ratio. The distance between three or five bursts leads to substantially steeper slopes of the measuring line, and therefore to a substantially improved determination of the speed. An even greater time shift of the second signal to the first signal can further increase the sensitivity of the determination of speed, but causes a noticeable lengthening of the measurement time and thus of the response rate.

The aim below is to explain the invention further with the aid of exemplary embodiments illustrated in the drawing, in which.

Figure 1:
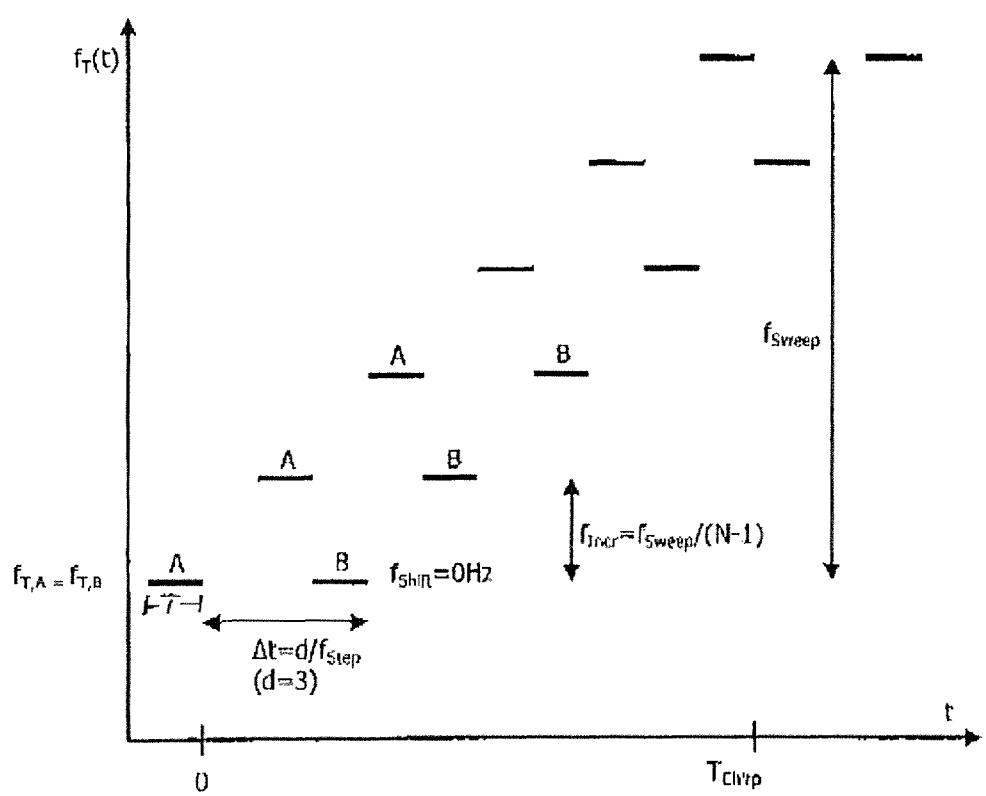
FIG. 1 is a schematic of second mutually interleaved emitted signals.

FIG. 1 shows a first signal A and a second signal B which are emitted in a mutually interleaved fashion. The first signal A consists of a plurality of signal sections which are emitted over a period T. The period T corresponds to a frequency $f_{Step}$ via $T=1/f_{Step}$. A pause of equal length in which signal sections of the signal B can be emitted is provided between the signal sections of the signal A. In the exemplary embodiment illustrated, the second signal B begins with a time delay of dT ($=d/f_{Step}$), where d=3 in this case, so that no signal section of the second signal is emitted between the two first two bursts of the first signal A. d is odd for the interleaving without a pause in transmission, and can therefore also be =5, for example.

In the preferred exemplary embodiment illustrated in FIG. 1, the frequency step between the signal sections of the first signal A and the signal sections of the second signal B is in each case constant $f_{Incr}$, so that the slope of the signals A and B over the swept frequency range $f_{Sweep}$ runs parallel to one another. The frequency difference between the first signal section of the first signal A and the first signal section of the second signal B is zero. The frequency range swept by the frequency steps $f_{Incr}$ is $f_{Sweep}$. The duration of the signal period ($T_{Chirp}$) is $T_{Chirp}$. The parallelism of the signals A and B (and, if appropriate, one or more further signals) facilitates the evaluation.

Figure 2:
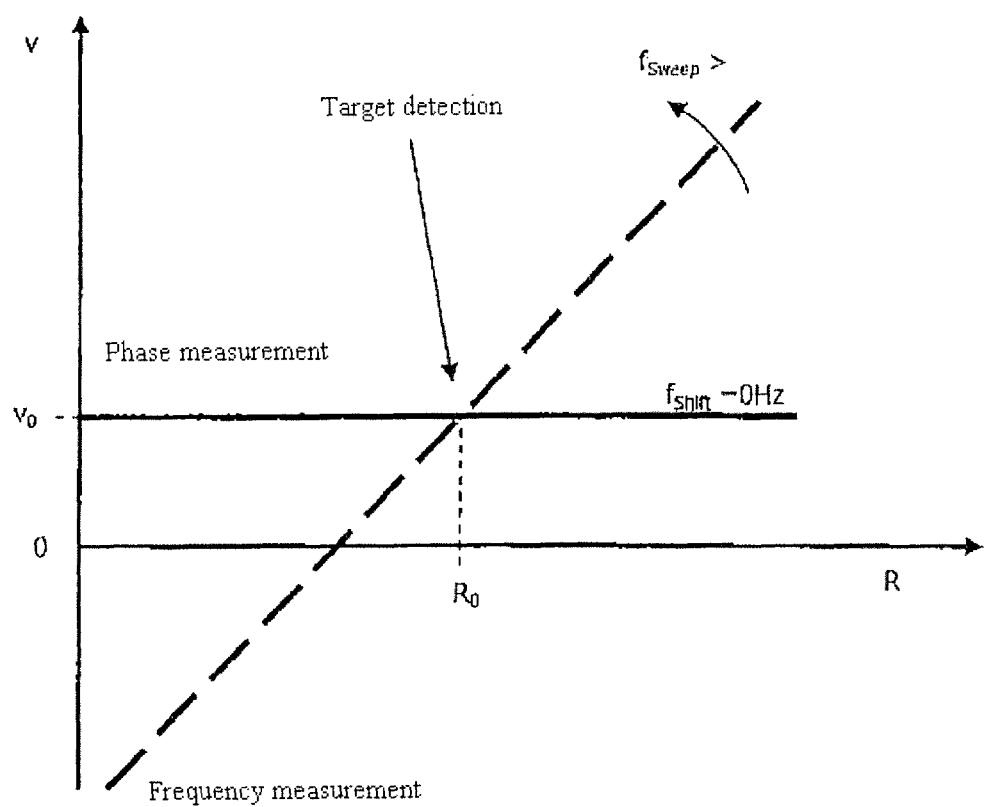
FIG. 2 is a representation of ambiguity straight lines in the RV diagram.

FIG. 2 illustrates the ambiguity straight lines in the distance/speed coordinate system for phase measurement and for frequency measurement. The straight line characterizing the phase measurement runs parallel to the R axis. This means that the speed $V_0$ in the phase measurement is independent of the distance $R_0$ of the object. The point of intersection of the straight lines resulting from the frequency measurement with the straight lines for the phase measurement enables the distance $R_0$ to be determined.

It is therefore to be seen that the phase difference $\Delta \varphi$ forms the basis for determining the relative speed V. It is valid (for the carrier frequency $f_c$ of the radar signal, which is currently 24 GHz or 77 GHz) that:

$$v = \frac{c \cdot f_{Step} \cdot \Delta \varphi}{4 \cdot \pi \cdot d \cdot \left(f_c + \frac{f_{Sweep}}{2}\right)}.$$

Possible spatial resolution $\Delta R$ is yielded as $$\Delta R = \frac{c}{2 \cdot f_{Sweep}}$$

$$k = \frac{v}{\Delta v} - \frac{R}{\Delta R} \Leftrightarrow \frac{v}{\Delta v} = \frac{R}{\Delta R} + k.$$

The speed resolution $\Delta v$ results from the CPI length of a signal section $T_{Chirp}$. Each of the two signals is evaluated by a Fourier transformation and a threshold value detection with the aid of its signal sequences formed from the bursts. A single object at a specific distance and with a specific speed is detected in both sequences of the same integer index $k=k_A=k_B$ in the Fourier transformed output signal of the two evaluated spectra. The same distance and speed ambiguities will occur in the two signal sequences. The measured phases $\varphi A$ and $\varphi B$ of the two complex spectral peaks differ from one another and include the differentiating speed information, which can be used to resolve the ambiguity. The phase difference $\Delta \varphi = \varphi B - \varphi A$ for the determination of distance and the determination of speed can be evaluated on the basis of the coherent measurement technology in the two sequences. The phase difference Δφ can be described analytically by the following equation:

$$\Delta \varphi = \frac{\pi}{N-1} \cdot \frac{v}{\Delta v},$$

N being the number of frequency steps in each transmission frequency A and B of the two different frequencies. Δφ can be ambiguous in the first calculation, but the ambiguities can be resolved by combining the measurement results in accordance with the above equation. The point of intersection of the two measurement results leads to an unambiguous determination of the distance and the relative speed.

The following unambiguous measurement results are obtained by taking account of the phase difference Δφ:

$$R_0 = \frac{\Delta R}{\pi} \cdot \left((N-1) \cdot \frac{\Delta \varphi}{d} - \pi \cdot k\right)$$

$$v_0 = \frac{(N-1) \cdot \Delta v}{\pi} \cdot \frac{\Delta \varphi}{d}.$$

In FIG. 2, the coordinates $R_0$, $V_0$ correspond to the point of intersection of the two ambiguity straight lines.

Figure 3:
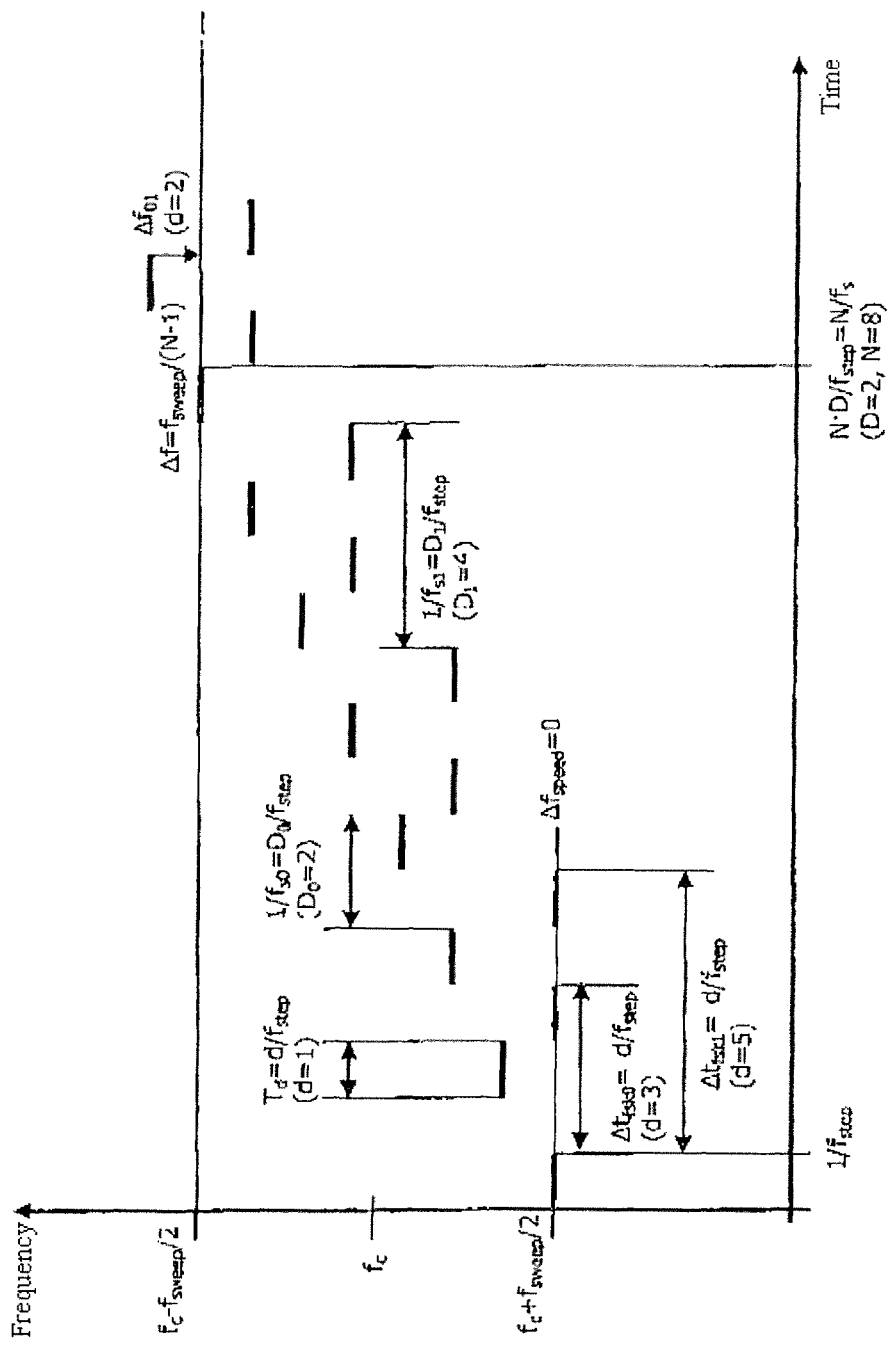
FIG. 3 is a representation in accordance with FIG. 1 for a variant of the second signal which is within the scope of the invention.

FIG. 3 illustrates that a modification is also possible within the scope of the invention in which the second signal is emitted interleaved twice with the first signal. The second signal is emitted with in each case two signal sections of the same frequency into the gaps between the second and the third signal sections and between the third and the fourth signal sections of the first signal A. Correspondingly, with the third signal section of the first signal A there are signal sections of the same frequency in the gaps between the fourth and fifth and fifth and sixth signal sections of the first signal A. It follows therefrom that the frequency hop between the signal section pairs of the same frequency, of the second signal B corresponds to two $f_{Incr}$ of the first signal A.

With the same measurement time, it is possible in the case of this variant to attain an additional differential phase measured value for the speed per resolved peak so the measurement accuracy and the unambiguous measurement range for the relative speed are increased.

It may be seen from FIG. 3 that one or more of the signals can be "extended" beyond the regions prescribed by $f_{Sweep}$. In particular, it is possible thereby to achieve that the modulation hole d=3 or d=5, which is present at the beginning of the range $f_{Sweep}$ need not be included in the evaluation owing to the absence of a signal section of the second signal B, since because of the extended signals beyond the end of the range $f_{Sweep}$ an evaluation is possible over a frequency range which is not disturbed by the modulation hole and which corresponds to $f_{Sweep}$.

The exemplary embodiments indicate that the first and second signals preferably begin with the same frequency for sweeping the modulation range.

The invention claimed is:

1. A method for determining the distance (R) and relative speed (v) of at least one object remote from an observation point, comprising:
continuously emitting a transmission signal with a transmitter, the transmission signal including at least a first and a second electromagnetic signal with a respective signal period ($T_{chirp}$) from the observation point, wherein
the first and second electromagnetic signals including signal sections of constant frequency and of a prescribed equal duration, the signal sections of at least one of the first and second electromagnetic signals sweeping a prescribed modulation range with frequency steps,
the first and second electromagnetic signals being emitted in a fashion interleaved with one another by virtue of the fact that the signal sections of the first and second electromagnetic signals are mutually adjacent in time,
a frequency hop being present between the mutually adjacent signal sections of first and second electromagnetic signals, and
the corresponding signal sections of the first and second electromagnetic signals are emitted at the same frequencies;
receiving reflected signals reflected from the at least one object with a receiver, wherein the reflected signals include signal sections corresponding to the signal sections in the emitted first and second electromagnetic signals;
carrying out a mixing operation with the transmission signal to transform one or more reflected signals into a baseband in a common analog channel;
carrying out an analog-to-digital conversion and sampling the signal sections of at least some of the reflected signals and sampling at least one sample for each signal section;
separately evaluating the samples for the reflected first and second signals by means of a Fourier transformation stage; and
determining the frequency of peaks corresponding to the signal sections and determining a phase difference between the reflected first and second electromagnetic signals,
determining a relative speed of the at least one object directly and unambiguously independent of the distance to the at least one object by the phase difference between signal sections of the first and second reflected signals which are emitted at the same frequency, and then
determining an unambiguous measurement of distance to the at least one object as a function of a number of frequency steps in each transmission frequency of said first and second electromagnetic signals at two different frequencies, wherein the unambiguous measurement of distance is determined only after determining the relative speed of the at least one object directly and unambiguously independent of the distance.

2. The method as claimed in claim 1, wherein the first and the second electromagnetic signals are identical and are emitted with a mutual time offset.

3. The method as claimed in claim 2, wherein the time offset corresponds to the length of three signal sections (3T).

4. The method as claimed in claim 2, wherein the time offset corresponds to the length of five signal sections (5T).

5. The method as claimed in claim 1, wherein the second electromagnetic signal is formed from each second signal section of the first electromagnetic signal, and the second electromagnetic signal is emitted in the form of two signal sections interleaved twice with a signal section of the first electromagnetic signal.

* * * * *